(12) United States Patent
Velev et al.

(10) Patent No.: US 10,897,790 B2
(45) Date of Patent: Jan. 19, 2021

(54) INDICATING RADIO CAPABILITY CHANGES IN AN INACTIVE STATE

(71) Applicant: Lenovo (Singapore) PTE. LTD., New Tech Park (SG)

(72) Inventors: Genadi Velev, Darmstadt (DE); Prateek Basu Mallick, Langen (DE); Joachim Loehr, Wiesbaden (DE); Ravi Kuchibhotla, Clarendon Hills, IL (US); Andreas Kunz, Ladenburg (DE)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/439,434

(22) Filed: Jun. 12, 2019

(65) Prior Publication Data

US 2020/0045767 A1    Feb. 6, 2020

Related U.S. Application Data

(60) Provisional application No. 62/714,533, filed on Aug. 3, 2018.

(51) Int. Cl.
*H04W 76/27* (2018.01)
*H04W 8/22* (2009.01)

(52) U.S. Cl.
CPC ............ *H04W 76/27* (2018.02); *H04W 8/22* (2013.01)

(58) Field of Classification Search
CPC . H04W 74/0833; H04W 4/70; H04W 72/048; H04W 76/11; H04W 74/006; H04W 76/27
See application file for complete search history.

(56) References Cited

U.S. PATENT DOCUMENTS

2018/0176834 A1* 6/2018 Wei .................. H04W 36/0066
2019/0394668 A1* 12/2019 Shaheen ............. H04W 72/048
2020/0100088 A1* 3/2020 Kim ...................... H04W 8/005

FOREIGN PATENT DOCUMENTS

WO    2013091665 A1    6/2013

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

(Continued)

*Primary Examiner* — Jung H Park
(74) *Attorney, Agent, or Firm* — Kunzler Bean & Adamson

(57) ABSTRACT

Apparatuses, methods, and systems are disclosed for indicating radio capability changes in an inactive state. One method includes detecting a trigger to change radio capabilities of a UE in an inactive state; transmitting a first message comprising information indicating to change the radio capabilities of the UE, wherein the first message comprises a first access stratum message; receiving a second message, wherein the second message comprises information corresponding to an action, and the second message comprises a second access stratum message; receiving a third message comprising information requesting the radio capabilities of the UE; transmitting a fourth message comprising the radio capabilities of the UE; and receiving a fifth message comprising information for configuring a radio resource control of the UE and activating data radio bearers of the UE, wherein the fifth message is determined based on the radio capabilities of the UE.

23 Claims, 9 Drawing Sheets

(56) References Cited

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 13)" 3GPP TS 24.301 V13.6.1 , Jun. 2016, pp. 1-452.
ETSI, 5G; System Architecture for the 5G System (3GPP TS 23.501 version 15.2.0 Release 15), ETSI TS 123 501 V15.2.0, Jun. 2018, pp. 1-219.
International Application No. PCT/IB2019/000776, Notification of Transmittal of the International Search Report and the Written Opinion of the International Search Authority, dated Jan. 7, 2020, pp. 1-13.
Motorola Mobility, et al., S2-185361, UE Radio Capability Handling in the 5GS, SA WG2 Meeting #S2-127BIS, May 28-Jun. 1, 2018, pp. 1-3.
Intel et al., C1-183120, UE Radio Capability Update Using TAU Procedures, 3GPP TSG-CT WG1 Meeting #111, May 21-25, 2018, pp. 1-17.
Motorola Mobility, et al., S2-186098, UE Radio Capability Handling in the 5GS, SA WG2 Meeting #S2-127BIS, May 28-Jun. 1, 2018, pp. 1-21.
Qualcomm Incorporated, S2-186178, Alignment of Radio Capabilities Procedure, 3GPP TSG-SA WG2 Meeting #127bis, May 28-Jun. 1, 2018, pp. 1-2.

* cited by examiner

INDICATING RADIO CAPABILITY CHANGES IN AN INACTIVE STATE

CROSS-REFERENCE TO RELATED APPLICATIONS

This application claims priority to U.S. Patent Application Ser. No. 62/714,533 entitled "APPARATUSES, METHODS, AND SYSTEMS FOR RADIO CAPABILITY CHANGE DURING AN INACTIVITY PERIOD" and filed on Aug. 3, 2018 for Genadi Velev, which is incorporated herein by reference in its entirety.

FIELD

The subject matter disclosed herein relates generally to wireless communications and more particularly relates to indicating radio capability changes in an inactive state.

BACKGROUND

The following abbreviations are herewith defined, at least some of which are referred to within the following description: Third Generation Partnership Project ("3GPP"), $4^{th}$ Generation ("4G"), $5^{th}$ Generation ("5G"), 5G Core Network ("5GC"), 5G System ("5GS"), Authorization Authentication ("AA"), Authorization Authentication Request ("AAR"), Positive-Acknowledgment ("ACK"), Application Function ("AF"), Aggregation Level ("AL"), Access and Mobility Management Function ("AMF"), Access Network ("AN"), Access Point ("AP"), Access Stratum ("AS"), Authentication Server Function ("AUSF"), Attribute Value Pair ("AVP"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Cell-Radio Network Temporary Identifier ("C-RNTI"), Carrier Aggregation ("CA"), CA Network ("CAN"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Connection Management ("CM"), Commercial Mobile Alert Service ("CMAS"), Core Network ("CN"), Coordinated Multipoint ("CoMP"), Control Plane ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Dual Connectivity ("DC"), Discrete Fourier Transform Spread ("DFTS"), Downlink Control Information ("DCI"), Downlink ("DL"), Demodulation Reference Signal ("DMRS"), Data Radio Bearer ("DRB"), Dual Registration Mode ("DR mode"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), EPS Mobility Management ("EMM"), Evolved Node B ("eNB"), Effective Isotropic Radiated Power ("EIRP"), European Telecommunications Standards Institute ("ETSI"), Earthquake and Tsunami Warning System ("ETWS"), Evolved Packet Core Network ("EPC"), Evolved Packet System ("EPS" e.g., 4G), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range ("FR"), Guaranteed Bit Rate ("GBR"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), IP Multimedia System ("IMS"), International Mobile Subscriber Identity ("IMSI"), International Mobile Telecommunications ("IMT"), Internet-of-Things ("IoT"), Internet Protocol ("IP"), Layer 2 ("L2"), Licensed Assisted Access ("LAA"), Load Based Equipment ("LBE"), Listen-Before-Talk ("LBT"), Logical Channel ("LCH"), Logical Channel ID ("LCD"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Multimedia Telephony ("MM-TEL"), Mobile Network Operator ("MNO"), massive MTC ("mMTC"), Maximum Power Reduction ("MPR"), Multimedia Priority Service ("MPS"), Machine Type Communication ("MTC"), Multi User Shared Access ("MUSA"), Inter-CN Interface Between a 4G MME and a 5GS AMF ("N26"), Non Access Stratum ("NAS"), Narrowband ("NB"), NB IoT ("NB-IoT"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Cover Codes ("OCC"), Orthogonal Frequency Division Multiplexing ("OFDM"), Open-Loop ("OL"), Other System Information ("OSI"), Paging-Radio Network Temporary Identifier ("P-RNTI"), P-Access-Network-Info ("PANT"), Power Angular Spectrum ("PAS"), Physical Broadcast Channel ("PBCH"), Power Control ("PC"), LTE-to-V2X Interface ("PC5"), Primary Cell ("PCell"), Policy Control Function (""PCF"), Physical Cell ID ("PCID"), Policy and Charging Rules Function ("PCRF"), Proxy-Call Session Control Function ("P-CSCF"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Packet Data Network Gateway ("PGW"), Packet Data Network Gateway-Control ("PGW-C"), Packet Data Network Gateway-User ("PGW-U"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Provisional Response Acknowledgement ("PRACK"), Physical Resource Block ("PRB"), Packet Switched ("PS"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Random Access-Radio Network Temporary Identifier ("RA-RNTI"), Registration Area ("RA"), Radio Access Network ("RAN"), Radio Access Technology ("RAT"), Random Access Procedure ("RACH"), Random Access Response ("RAR"), Resource Element Group ("REG"), Radio Frequency ("RF"), Radio Link Control ("RLC"), Radio Link Monitoring ("RLM"), Registration Management ("RM"), Radio Network Temporary Identifier ("RNTI"), Registration Request ("RR"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), System Information-Radio Network Temporary Identifier ("SI-RNTI"), Serving-Call Session Control Function ("S-CSCF"), Sparse Code Multiple Access ("SCMA"), Scheduling Request ("SR"), Signaling Radio Bearer ("SRB"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Session Description Protocol ("SDP"), Service Data Unit ("SDU"), Serving Gateway ("SGW"), System Information ("SI"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Session Initiation Protocol ("SIP"), Service Level Agreement ("SLA"), Session Management ("SM"), Session Management Function ("SMF"), Special Cell ("SpCell"), Single Network Slice Selection Assistance Information ("S-NSSAI"), Single Registration Mode ("SR mode"), Shortened TTI ("sTTI"), Synchronization Signal ("SS"), Synchronization Signal Block ("SSB"), Supplementary Uplink ("SUL"), Subscriber Permanent Identifier ("SUPI"), Temporary Cell-Radio Network Temporary Identifier ("TC-RNTI"), Tracking Area ("TA"), TA Indicator ("TAI"), TA Update ("TAU"), Transport Block ("TB"), Transport Block Size ("TBS"), Time-Division Duplex ("TDD"), Time Division Multiplex ("TDM"), Time Division Orthogonal Cover Code ("TD-OCC"), Tunnel Endpoint Identifier ("TEID"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal, Mobile Equipment ("ME"), SIM) ("UE"), Universal Integrated Circuit Card ("UICC"), Uplink ("UL"), Universal Mobile Telecommunications System ("UMTS"), User Plane ("UP"), User Plane Function ("UPF"), Uplink Pilot Time Slot ("UpPTS"), Ultra-reliability and Low-latency Communications ("URLLC"), UE Route Selection Policy ("URSP"), UMTS Terrestrial Radio Access ("UTRA"), UMTS Terrestrial Radio Access Network ("UTRAN"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, radio capabilities for a UE may change. In such networks, other devices may be unaware of the UEs change in radio capabilities.

BRIEF SUMMARY

Methods for indicating radio capability changes in an inactive state are disclosed. Apparatuses and systems also perform the functions of the apparatus. One embodiment of a method includes detecting a trigger to change radio capabilities of a user equipment in an inactive state. In certain embodiments, the method includes transmitting a first message comprising information indicating to change the radio capabilities of the user equipment, wherein the first message comprises a first access stratum message. In various embodiments, the method includes receiving a second message in response to transmitting the first message, wherein the second message comprises information corresponding to an action, and the second message comprises a second access stratum message. In some embodiments, the method includes receiving a third message comprising information requesting the radio capabilities of the user equipment. In certain embodiments, the method includes transmitting a fourth message comprising the radio capabilities of the user equipment. In various embodiments, the method includes receiving a fifth message comprising information for configuring a radio resource control of the user equipment and activating data radio bearers of the user equipment, wherein the fifth message is determined based on the radio capabilities of the user equipment.

One apparatus for indicating radio capability changes in an inactive state includes a processor that detects a trigger to change radio capabilities of a user equipment in an inactive state. In some embodiments, the apparatus includes a transmitter that transmits a first message comprising information indicating to change the radio capabilities of the user equipment, wherein the first message comprises a first access stratum message. In certain embodiments, the apparatus includes a receiver that: receives a second message in response to transmitting the first message, wherein the second message comprises information corresponding to an action, and the second message comprises a second access stratum message; and receives a third message comprising information requesting the radio capabilities of the user equipment. In various embodiments, the transmitter transmits a fourth message comprising the radio capabilities of the user equipment, and the receiver receives a fifth message comprising information for configuring a radio resource control of the user equipment and activating data radio bearers of the user equipment, wherein the fifth message is determined based on the radio capabilities of the user equipment.

One method for indicating radio capability changes in an inactive state includes receiving a first message comprising information indicating to change radio capabilities of a user equipment, wherein the first message comprises a first access stratum message, and the first message is received in response to the user equipment detecting a trigger to change the radio capabilities of the user equipment in an inactive state. In various embodiments, the method includes transmitting a second message in response to receiving the first message, wherein the second message comprises information corresponding to an action, and the second message comprises a second access stratum message. In certain embodiments, the method includes transmitting a third message comprising information requesting the radio capabilities of the user equipment. In some embodiments, the method includes receiving a fourth message comprising the radio capabilities of the user equipment. In various embodiments, the method includes transmitting a fifth message comprising information for configuring a radio resource control of the user equipment and activating data radio bearers of the user equipment, wherein the fifth message is determined based on the radio capabilities of the user equipment.

One apparatus for indicating radio capability changes in an inactive state includes a receiver that receives a first message comprising information indicating to change radio capabilities of a user equipment, wherein the first message comprises a first access stratum message, and the first message is received in response to the user equipment detecting a trigger to change the radio capabilities of the user equipment in an inactive state. In some embodiments, the apparatus includes a transmitter that: transmits a second message in response to receiving the first message, wherein the second message comprises information corresponding to an action, and the second message comprises a second access stratum message; and transmits a third message comprising information requesting the radio capabilities of the user equipment. In certain embodiments, the receiver receives a fourth message comprising the radio capabilities of the user equipment, and the transmitter transmits a fifth message comprising information for configuring a radio resource control of the user equipment and activating data radio bearers of the user equipment, wherein the fifth message is determined based on the radio capabilities of the user equipment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
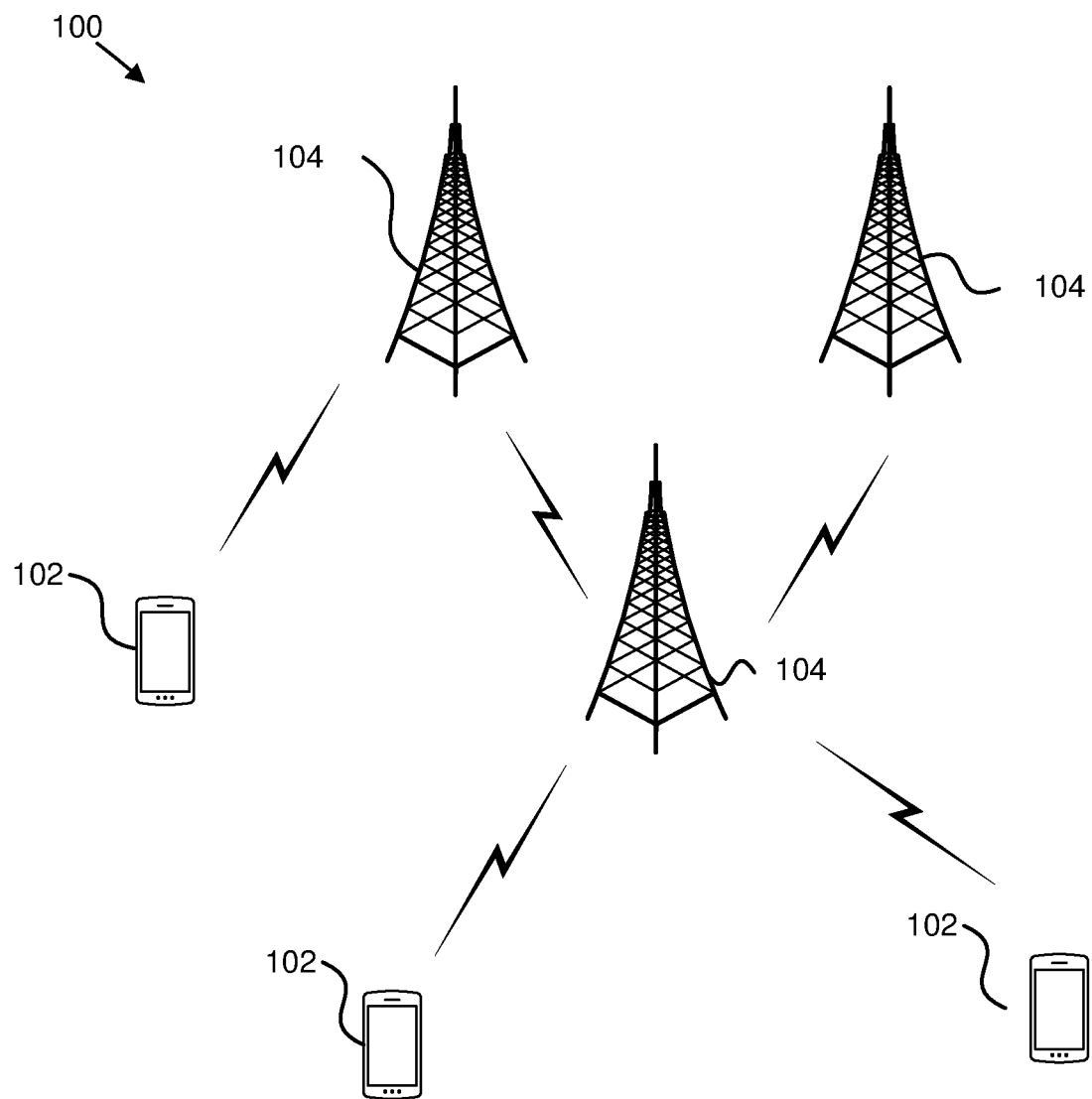
FIG. 1 is a schematic block diagram illustrating one embodiment of a wireless communication system for transmitting and/or receiving information indicating radio capability changes in an inactive state.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving information indicating radio capability changes in an inactive state. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may detect a trigger to change radio capabilities of a user equipment in an inactive state. In certain embodiments, the remote unit 102 may transmit a first message comprising information indicating to change the radio capabilities of the user equipment, wherein the first message comprises a first access stratum message. In various embodiments, the remote unit 102 may receive a second message in response to transmitting the first message, wherein the second message comprises information corresponding to an action, and the second message comprises a second access stratum message. In some embodiments, the remote unit 102 may receive a third message comprising information requesting the radio capabilities of the user equipment. In certain embodiments, the remote unit 102 may transmit a fourth message comprising the radio capabilities of the user equipment. In various embodiments, the remote unit 102 may receive a fifth message comprising information for configuring a radio resource control of the user equipment and activating data radio bearers of the user equipment, wherein the fifth message is determined based on the radio capabilities of the user equipment. Accordingly, the remote unit 102 may be used for transmitting information indicating radio capability changes in an inactive state.

In certain embodiments, a network unit 104 may receive a first message comprising information indicating to change radio capabilities of a user equipment, wherein the first message comprises a first access stratum message, and the first message is received in response to the user equipment detecting a trigger to change the radio capabilities of the user equipment in an inactive state. In various embodiments, the network unit 104 may transmit a second message in response to receiving the first message, wherein the second message comprises information corresponding to an action, and the second message comprises a second access stratum message. In certain embodiments, the network unit 104 may transmit a third message comprising information requesting the radio capabilities of the user equipment. In some embodiments, the network unit 104 may receive a fourth message comprising the radio capabilities of the user equipment. In various embodiments, the network unit 104 may transmit a fifth message comprising information for configuring a radio resource control of the user equipment and activating data radio bearers of the user equipment, wherein the fifth message is determined based on the radio capabilities of the user equipment. Accordingly, the network unit 104 may be used for receiving information indicating radio capability changes in an inactive state.

Figure 2:
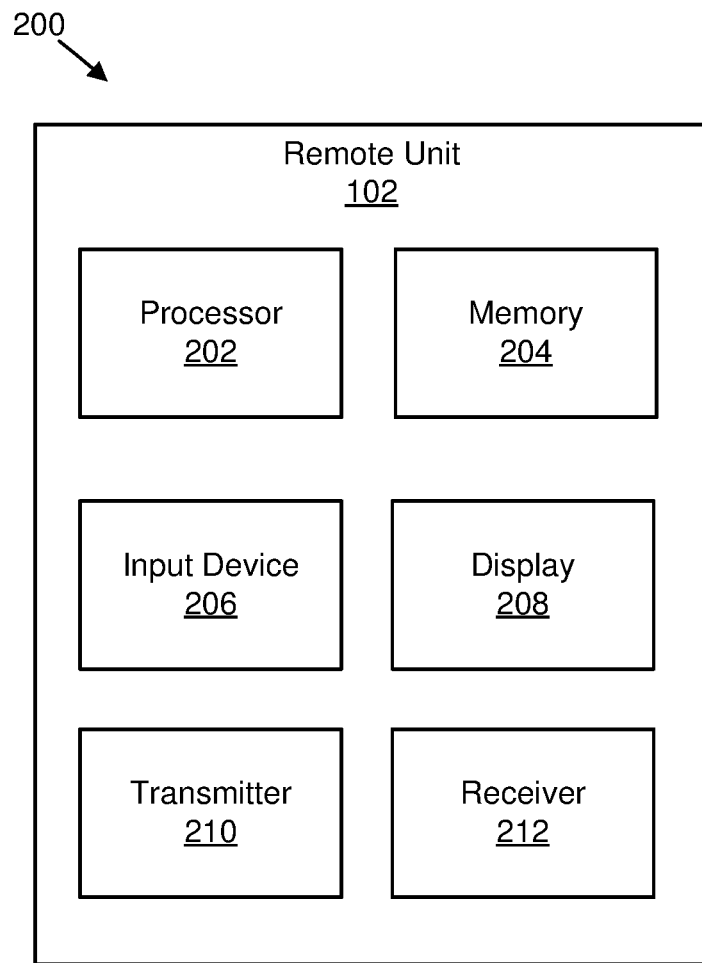
FIG. 2 is a schematic block diagram illustrating one embodiment of an apparatus that may be used for transmitting information indicating radio capability changes in an inactive state.

FIG. 2 depicts one embodiment of an apparatus 200 that may be used for transmitting information indicating radio capability changes in an inactive state. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 detects a trigger to change radio capabilities of a user equipment in an inactive state. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In various embodiments, the transmitter 210 transmits a first message comprising information indicating to change the radio capabilities of the user equipment, wherein the first message comprises a first access stratum message. In certain embodiments, the receiver 212: receives a second message in response to transmitting the first message, wherein the second message comprises information corresponding to an action, and the second message comprises a second access stratum message; and receives a third message comprising information requesting the radio capabilities of the user equipment. In various embodiments, the transmitter 210 transmits a fourth message comprising the radio capabilities of the user equipment, and the receiver 212 receives a fifth message comprising information for configuring a radio resource control of the user equipment and activating data radio bearers of the user equipment, wherein the fifth message is determined based on the radio capabilities of the user equipment.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
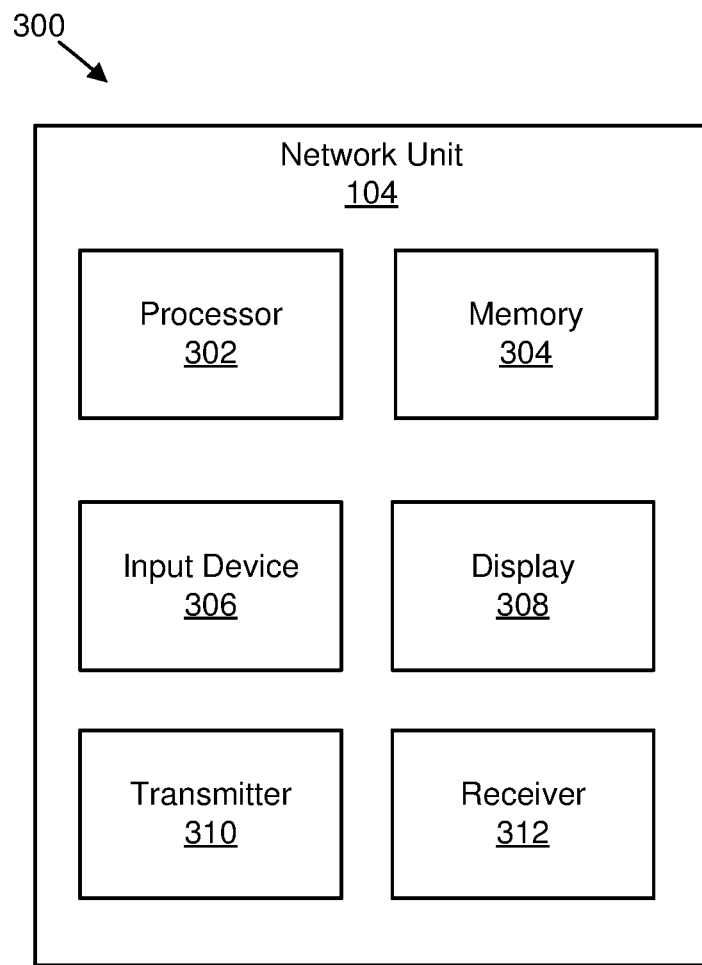
FIG. 3 is a schematic block diagram illustrating one embodiment of an apparatus that may be used for receiving information indicating radio capability changes in an inactive state.

FIG. 3 depicts one embodiment of an apparatus 300 that may be used for receiving information indicating radio capability changes in an inactive state. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 receives a first message comprising information indicating to change radio capabilities of a user equipment, wherein the first message comprises a first access stratum message, and the first message is received in response to the user equipment detecting a trigger to change the radio capabilities of the user equipment in an inactive state. In some embodiments, the transmitter 310: transmits a second message in response to receiving the first message, wherein the second message comprises information corresponding to an action, and the second message comprises a second access stratum message; and transmits a third message comprising information requesting the radio capabilities of the user equipment. In certain embodiments, the receiver 312 receives a fourth message comprising the radio capabilities of the user equipment, and the transmitter 310 transmits a fifth message comprising information for configuring a radio resource control of the user equipment and activating data radio bearers of the user equipment, wherein the fifth message is determined based on the radio capabilities of the user equipment.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, a UE (e.g., a remote unit 102) may be in an idle state (e.g., ECM IDLE state if attached to LTE and/or EPC, or CM IDLE state if registered with NG-RAN and/or 5GC) if changing a radio capability. In such embodiments, an upper layer (e.g., NAS layer) may request that the access stratum (AS) layer changes the radio capabilities. In some embodiments, the AS layer may change radio capability due to various reasons (e.g., overheating, etc.). In various embodiments, after an AS layer has applied radio capability changes, the NAS layer may generate and send an NAS mobility management message (e.g., TAU request or registration request) to a mobility serving entity (e.g., MME or AMF).

In some embodiments, the UE may be in an inactive state (e.g., either 1) in an RRC inactive state, such as in 5GS and/or 5G, or 2) a signaling connection is suspended, such as in LTE or NB-IoT access as specified in EPS and/or 4G). Various embodiments described herein demonstrate how radio capability changes may be made if the UE is in the inactive state.

As described herein, a RAN node may be a radio access entity of different RATs. For example, a RAN node may be an LTE RAN node (e.g., an eNB), an NG-RAN node (e.g., eNB or gNB), or any other RATs node. In various embodiments, a UE is in an idle state (e.g. ECM IDLE state if attached to LTE and/or EPC, or CM IDLE state if registered with NG-RAN and/or 5GC) while changing its radio capabilities.

As may be appreciated, there may be various reasons for changing a UE's radio capabilities. For example, the UE detect internally that there should be a radio capability change as a result of an implementation and/or a configuration (e.g., initiation of DR mode, termination of DR mode, 5GS non-supported feature use, etc.). In some embodiments, an NAS layer may request the AS layer to reconfigure radio capabilities (e.g., increase or decrease radio capabilities). In some embodiments, if the NAS layer in the UE is not in an idle state, the NAS layer may wait until the UE transitions to the idle state to indicate changed radio capabilities to a network. However, as described herein, a UE may request an update to its radio capabilities while the UE is in an inactive state.

In a first embodiment, a UE does not transition from an inactive state to an idle state to perform a UE radio capability change procedure, but performs the UE radio capability change procedure from the inactive state (e.g., "ECM-IDLE state with suspend indication" or "CM CONNECTED mode with RRC inactive indication"). In such an embodiment, the UE sends a NAS update message toward a CN serving node (e.g., MME or AMF) without going to an idle state. The NAS update message may include a TAU request in EPS or a registration request in 5GS and also may include an indication for a radio capability update. As may be appreciated, the first embodiment reuses an already available UE AS context in the UE's AS layer and in the RAN. With this reuse, signaling over a radio interface and over a backhaul is reduced because the UE AS context in the RAN is already available and does not need to be signaled again. As used herein, a "UE AS context" may include an AS context (e.g., security context, bearer context (including QoS and policy per bearer), UE radio capability, and/or other information).

In a second embodiment, a UE first transitions from an inactive state (e.g., "ECM-IDLE state with suspend indication" or "CM CONNECTED mode with RRC inactive indication") to an idle state, and then the UE sends an NAS update message toward a CN serving node. The NAS update message may include an indication for a radio capability update.

Figure 4:
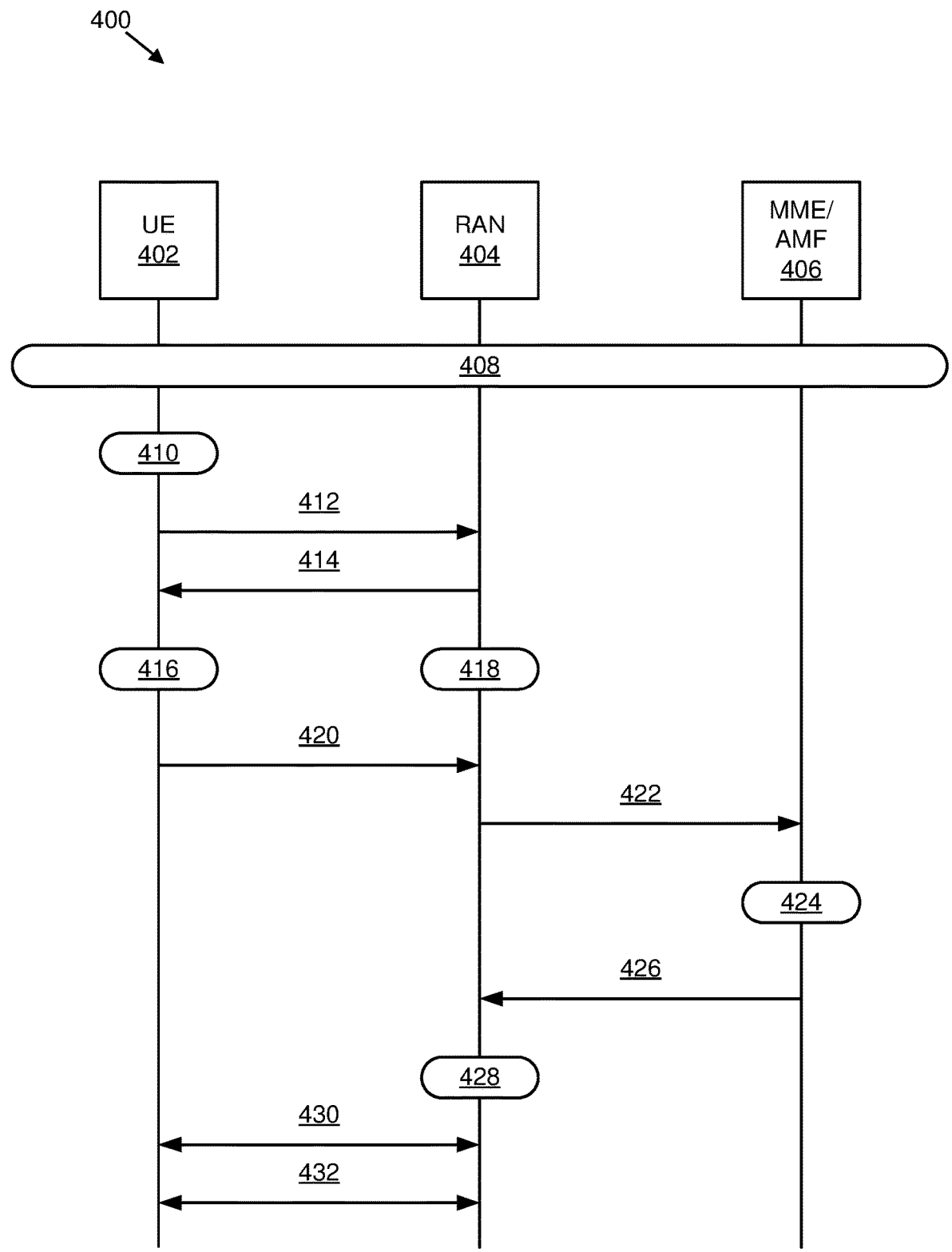
FIG. 4 is a schematic block diagram illustrating one embodiment of communications for transmitting information indicating radio capability changes in an inactive state.

In certain embodiments, a RAN node queries a UE radio capability after an NAS update with an MME/AMF is performed, as illustrated in FIG. 4. If the UE's NAS layer is an inactive state (e.g., "ECM-IDLE state with suspend indication" or "CM CONNECTED mode with RRC inactive indication"), the UE NAS layer requests an AS layer to perform a radio capability change and/or is made aware of a need of the AS layer to change the radio capabilities. Accordingly, the NAS layer creates an NAS update message (e.g., EPS TAU request, 5GS registration request, RR) and includes an indication of a radio capability change to a mobility entity and/or an access serving entity (e.g., MME, AMF).

In various embodiments, a UE's AS layer performs a resume procedure to send an NAS message (e.g., TAU request, RR with an indication of a UE radio capability update) carrying information about a radio capability change to an MME and/or AMF. In some embodiments, the UE sends an RRC resume request message, and activates an SRB (e.g., SRB1). In certain embodiments, the MME and/or AMF sends an indication to a RAN node to indicate a need for a radio capability change and the RAN node retrieves the new radio capability from the UE. In various embodiments, the MME and/or AMF does not trigger release of current signaling corresponding to a RAN for the UE (e.g., without triggering transition to an idle state).

FIG. 4 is a schematic block diagram illustrating one embodiment of communications 400 for transmitting information indicating radio capability changes in an inactive state. The communications 400 illustrated occur between a UE 402, a RAN (e.g., RAN node) 404, and an MME/AMF (e.g., MME and/or AMF) 406. As may be appreciated, any of the communications 400 described herein may include one or more messages.

In one embodiment, in communications 408 between the UE 402, the RAN 404, and the MME/AMF 406, the UE 402 is registered in EPS or 5GS. The UE 402 is in an inactive state (e.g., "ECM-IDLE state with suspend indication" or "CM CONNECTED mode with RRC inactive indication").

In certain embodiments, the UE 402 changes 410 radio capabilities. Specifically, the NAS layer may change AS capabilities. In such embodiments, the UE NAS layer may know an RRC state (e.g., RRC connected state, RRC inactive state, RRC signaling connection is suspended). In some embodiments, if the RRC state is RRC inactive or the RRC signaling connection is suspended, and if the UE NAS layer is aware that the UE RRC layer supports a radio capability change during this state, the NAS layer generates and sends to the AS layer an NAS update message including an indication that a UE radio capability update is required. For example, in EPS, the NAS message is a TAU request message containing an indication for "UE Radio Capability Update." As another example, in 5GS the NAS RR message has a registration type set to mobility registration update indicating "UE Radio Capability Update."

In some embodiments, in a first communication 412 transmitted from the UE 402 to the RAN 404, the UE 402 sends a resume request message (e.g., RRCResumeRequest message) with a parameter indicating a change in radio capabilities. The parameter may not include actual change capabilities, but may include an indication that the UE 402 capabilities have changed compared with a previous RRC connection. In certain embodiments, the parameter may use a predefined LCID for the resume request message. In various embodiments, the resume request message may be an RRC message that is carried on an UL CCCH. In such embodiments, a LCID (e.g., a reserved LCID for UL) may be defined that identifies the CCCH and indicates to a network entity (e.g., eNB or gNB) that radio capability has changed. Table 1 shows some potential LCD values. It should be noted that 2 LCIDs are used in Table 1 to indicate CCCH of different sizes (e.g., specific to NR).

TABLE 1

| Index | LCID values |
|---|---|
| 000000 | CCCH of size 64 bits |
| 000001-100000 | Identity of the logical channel |
| 100001 | CCCH of size 48 bits |
| 100010 | CCCH of size 48 bits + radio capability change |
| 100011 | CCCH of size 64 bits + radio capability change |
| 110100 | Reserved |
| 110101 | Recommended bit rate query |
| 110110 | Multiple Entry PHR (four octet $C_i$) |
| 110111 | Configured Grant Confirmation |
| 111000 | Multiple Entry PHR (one octet $C_i$) |
| 111001 | Single Entry PHR |
| 111010 | C-RNTI |
| 111011 | Short Truncated BSR |
| 111100 | Long Truncated BSR |
| 111101 | Short BSR |

TABLE 1-continued

| Index | LCID values |
|---|---|
| 111110 | Long BSR |
| 111111 | Padding |

In certain embodiments, the parameter that indicates a radio capability change may be a flag (e.g., one bit) in a MAC header. In such embodiments, the flag may be set to "1" to indicate that the radio capability has changed, and the flag may be set to "0" to indicate that the radio capability has not changed. In various embodiments, a reserved bit ("R") in a MAC subheader may be used as the flag. Tables 2 through 4 illustrate various embodiments of using the reserved bit shown as "R".

TABLE 2

R/F/LCID/L MAC Subheader with 8-bit L field

| R | F | LCID |
|---|---|---|
|   | L |   |

TABLE 3

R/F/LCID/L MAC Subheader with 16-bit L field

| R | F | LCID |
|---|---|---|
|   | L |   |
|   | L |   |

TABLE 4

R/LCID MAC Subheader

| R | R | LCID |
|---|---|---|

In various embodiments, a resume cause value may be used in an RRC resume request message to indicate to the RAN 404 a radio capability change. In such embodiments, the RRC resume request message contains a resume cause field that is used to provide the RAN 404 (e.g., a gNB in 5G NR system) with information about the reason why the UE 402 is trying to resume the connection.

In some embodiments, in a second communication 414 transmitted from the RAN 404 to the UE 402, the RAN 404 sends a resume message (e.g., RRC resume message) to the UE 402. The resume message includes an indication to suspend the DRBs (e.g., the DRBs are not yet to be activated—no UL/DL data is to be sent due to the ongoing radio capability change procedure). The resume message may be a RRCResume message with a parameter for suspending (or not activating) the DRBs. For example, the RAN 404 may acknowledge an RRCResumeRequest with an RRCResume without including any RadioBearerConfig parameters and/or measConfig (e.g., for measurement configuration). In certain embodiments, as a result of the UE 402 receiving the RRCResume message, only the secure RRC signaling connection (e.g., SRB1 and/or SRB2) may be activated. As may be appreciated, the secure signaling connection may be activated with the assumption that none of the changes of the UE 402 AS capability change affects the UE's 402 security capabilities (e.g., supported security algorithms, etc.).

In various embodiments, in response to receiving the resume message with the indication to suspend the DRBs, the UE 402 suspends 416 all configured DRBs (e.g., no UL transmission) and the RAN 404 suspends 418 all configured DRBs (e.g., no DL transmission). In such embodiments, as a result the UE 402 doesn't consider the suspended DRBs for buffer status reporting and other L2 procedures. Therefore, only transmission of RRC signaling is possible (e.g., using SRB1 or SRB2 signaling radio bearers). In some embodiments, the resume message may include a new IE to convey the indication to suspend the DRBs. In certain embodiments, the resume message may use the MAC header (e.g., a one-bit flag) to convey the indication to suspend the DRBs. In some embodiments, the resume message may include a new LCID for DL-SCH to convey the indication to suspend the DRBs (e.g., LCID value 100001 identifying the SRB (e.g., DCCH) that is used to carry the resume message+indicating suspension of DRBs).

In certain embodiments, the UE 402 doesn't consider DRBs for UL transmission. In such embodiments, no new indication within the resume message is necessary. Accordingly, the UE 402 autonomously suspends the DRBs if receiving the resume message in response to having sent the resume request message with the indication that radio capabilities have changed.

In some embodiments, in a third communication 420 transmitted from the UE 402 to the RAN 404, the UE 402 sends a message (e.g., RRC message #5) to the RAN 404 carrying a NAS MM message. In such embodiments, the message may be a RRCResumeComplete message. The RRCResumeComplete message may include (or encapsulate) the NAS update message having an indication about the UE radio capability update (e.g., EPS TAU request message or 5GS registration request message having type mobility registration update indicating "UE Radio Capability Update").

In certain embodiments, in a fourth communication 422 transmitted from the RAN 404 to the MME/AMF 406, the RAN 404 sends the message (e.g., RRC message #5) carrying the NAS MM message to the MME/AMF 406.

At reception of the NAS message, the UE's 402 state in the MME/AMF 406 is CM connected. The MME/AMF 406 keeps 424 the UE 402 in ECM/CM connected state. The MME/AMF 406 deletes the stored UE 402 radio capabilities and initiates a procedure to inform the RAN 404 about the UE 402 radio capability change.

In various embodiments, in a fifth communication 426 transmitted from the MME/AMF 406 to the RAN 404, the MME/AMF 406 initiates signaling to inform the RAN 404 about the changed UE 402 radio capabilities.

At reception of the signaling, the RAN 404 deletes 428 the stored UE 402 radio capabilities.

In some embodiments, in a sixth communication 430 transmitted between the UE 402 and the RAN 404, the RAN 404 uses an existing RRC signaling connection to perform inquiry of the new UE 402 radio capabilities. For example, the UE 402 radio capability inquiry may be performed over the an SRB (e.g., SRB1 or SRB2) via RRC procedures. For example, the RAN 404 sends a UE 402 capability enquiry to the UE 402 and the UE 402 sends a UE 402 capability response including available radio capabilities. The RAN 404 stores the available radio capabilities in the UE 402 context. In certain embodiments, upon release of the signaling connection (e.g., upon transition to NAS/RRC IDLE state), the RAN 404 sends the UE 402 radio capabilities along with other RAN-specific information for storage in the CN serving node (e.g. the MME/AMF 406).

In certain embodiments, in a seventh communication 432 transmitted between the UE 402 and the RAN 404, the RAN 404 may perform a RRC connection reconfiguration procedure to configure (or reconfigure) the UE 402 radio resources and to enable and/or activate corresponding DRBs that already have a context in the UE's 402 AS context, and the RAN 404 UE 402 context from the time at which the RRC connection was suspended or the RRC connection was released with an RRC inactive indication.

In various embodiments, the UE 402 sends a NAS message identifying a new updated capability ID. The MME/AMF 406 or a similar entity in the network may translate this new capability ID (e.g., the capability ID may have been stored as an index pointer for a corresponding UE 402 capabilities including one or more of AS, RF, and NAS capabilities in the network/cloud) to fetch a set of UE 402 capabilities and transmit them to the RAN 404. In some embodiments, the UE 402 sends a message including only those capabilities that have changed as a delta to its base capabilities corresponding to a capability ID. The UE 402 may send this either: in response to a capability enquiry message received from the RAN 404; or, in a NAS message to the network so that the network can update its capability context for the UE 402 and send the updated capabilities to the RAN 404.

In certain embodiments, a capability ID is a short form (e.g., version) of complete capabilities supported by the UE 402. The network may identify a complete set of capabilities of a UE 402 based on a signaled short form identity (e.g., capability ID). As may be appreciated, each capability ID represented by a number of bits (e.g., 32, 64, 128, etc.) may be expanded into a complete set of capabilities through a mapping (e.g., fixed hard coded mapping) between an ID and capabilities.

Figure 5:
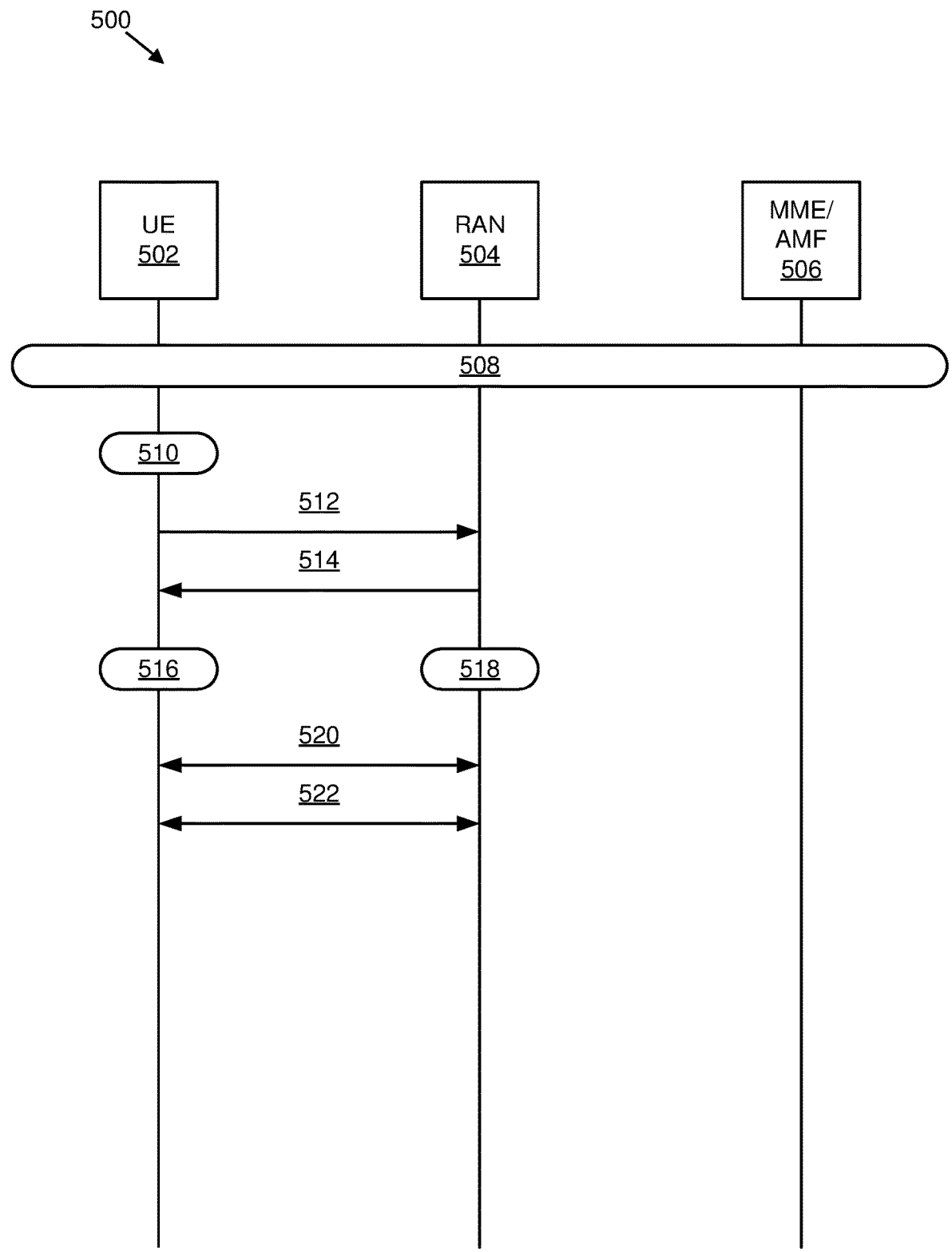
FIG. 5 is a schematic block diagram illustrating another embodiment of communications for transmitting information indicating radio capability changes in an inactive state.

FIG. 5 is a schematic block diagram illustrating another embodiment of communications 500 for transmitting information indicating radio capability changes in an inactive state. The communications 500 illustrated occur between a UE 502, a RAN (e.g., RAN node) 504, and an MME/AMF (e.g., MME and/or AMF) 506. As may be appreciated, any of the communications 500 described herein may include one or more messages.

In one embodiment, in communications 508 between the UE 502, the RAN 504, and the MME/AMF 506, the UE 502 is registered in EPS or 5GS. The UE 502 is in an inactive state (e.g., "ECM-IDLE state with suspend indication" or "CM CONNECTED mode with RRC inactive indication").

In certain embodiments, the UE 502 changes 510 radio capabilities. Specifically, the NAS layer may change AS capabilities. In such embodiments, the UE NAS layer may know an RRC state (e.g., RRC connected state, RRC inactive state, RRC signaling connection is suspended). In some embodiments, if the RRC state is RRC inactive or the RRC signaling connection is suspended, and if the UE NAS layer is aware that the UE RRC layer supports a radio capability change during this state, the NAS layer generates and sends to the AS layer an NAS update message including an indication that a UE radio capability update is required. For example, in EPS, the NAS message is a TAU request message containing an indication for "UE Radio Capability Update." As another example, in 5GS the NAS RR message has a registration type set to mobility registration update indicating "UE Radio Capability Update."

In some embodiments, in a first communication 512 transmitted from the UE 502 to the RAN 504, the UE 502 sends a resume request message (e.g., RRCResumeRequest message) with a parameter indicating a change in radio capabilities. The parameter may not include actual change capabilities, but may include an indication that the UE 502 capabilities have changed compared with a previous RRC connection. In certain embodiments, the parameter may use a predefined LCID for the resume request message. In various embodiments, the resume request message may be an RRC message that is carried on an UL CCCH. In such embodiments, a LCID (e.g., a reserved LCID for UL) may be defined that identifies the CCCH and indicates to a network entity (e.g., eNB or gNB) that radio capability has changed. Table 1 shows some potential LCID values. It should be noted that 2 LCDs are used in Table 1 to indicate CCCH of different sizes (e.g., specific to NR).

In certain embodiments, the parameter that indicates a radio capability change may be a flag (e.g., one bit) in a MAC header. In such embodiments, the flag may be set to "1" to indicate that the radio capability has changed, and the flag may be set to "0" to indicate that the radio capability has not changed. In various embodiments, a reserved bit ("R") in a MAC subheader may be used as the flag. Tables 2 through 4 illustrate various embodiments of using the reserved bit shown as "R".

In various embodiments, a resume cause value may be used in an RRC resume request message to indicate to the RAN 504 a radio capability change. In such embodiments, the RRC resume request message contains a resume cause field that is used to provide the RAN 504 (e.g., a gNB in 5G NR system) with information about the reason why the UE 502 is trying to resume the connection.

In some embodiments, in a second communication 514 transmitted from the RAN 504 to the UE 502, the RAN 504 sends a resume message (e.g., RRC resume message) to the UE 502. The resume message includes an indication to suspend the DRBs (e.g., the DRBs are not yet to be activated—no UL/DL data is to be sent due to the ongoing radio capability change procedure). The resume message may be a RRCResume message with a parameter for suspending (or not activating) the DRBs. For example, the RAN 504 may acknowledge an RRCResumeRequest with an RRCResume without including any RadioBearerConfig parameters and/or measConfig (e.g., for measurement configuration). In certain embodiments, as a result of the UE 502 receiving the RRCResume message, only the secure RRC signaling connection (e.g., SRB1 and/or SRB2) may be activated. As may be appreciated, the secure signaling connection may be activated with the assumption that none of the changes of the UE 502 AS capability change affects the UE's 502 security capabilities (e.g., supported security algorithms, etc.).

In various embodiments, in response to receiving the resume message with the indication to suspend the DRBs, the UE 502 suspends 516 all configured DRBs (e.g., no UL transmission) and the RAN 504 suspends 518 all configured DRBs (e.g., no DL transmission). In such embodiments, as a result the UE 502 doesn't consider the suspended DRBs for buffer status reporting and other L2 procedures. Therefore, only transmission of RRC signaling is possible (e.g., using SRB1 or SRB2 signaling radio bearers). In some embodiments, the resume message may include a new IE to convey the indication to suspend the DRBs. In certain embodiments, the resume message may use the MAC header (e.g., a one-bit flag) to convey the indication to suspend the DRBs. In some embodiments, the resume message may include a new LCID for DL-SCH to convey the indication to suspend the DRBs (e.g., LCID value 100001 identifying the SRB (e.g., DCCH) that is used to carry the resume message+indicating suspension of DRBs).

In certain embodiments, the UE 502 doesn't consider DRBs for UL transmission. In such embodiments, no new indication within the resume message is necessary. Accordingly, the UE 502 autonomously suspends the DRBs if receiving the resume message in response to having sent the resume request message with the indication that radio capabilities have changed.

In some embodiments, in a third communication 520 transmitted between the UE 502 and the RAN 504, the RAN 504 uses an existing RRC signaling connection to perform inquiry of the new UE 502 radio capabilities. For example, the UE 502 radio capability inquiry may be performed over the an SRB (e.g., SRB1 or SRB2) via RRC procedures. For example, the RAN 504 sends a UE 502 capability enquiry to the UE 502 and the UE 502 sends a UE 502 capability response including available radio capabilities. The RAN 504 stores the available radio capabilities in the UE 502 context. In certain embodiments, upon release of the signaling connection (e.g., upon transition to NAS/RRC IDLE state), the RAN 504 sends the UE 502 radio capabilities along with other RAN-specific information for storage in the CN serving node (e.g. the MME/AMF 506).

In certain embodiments, in a fourth communication 522 transmitted between the UE 502 and the RAN 504, the RAN 504 may perform a RRC connection reconfiguration procedure to configure (or reconfigure) the UE 502 radio resources and to enable and/or activate corresponding DRBs that already have a context in the UE's 502 AS context, and the RAN 504 UE 502 context from the time at which the RRC connection was suspended or the RRC connection was released with an RRC inactive indication.

In various embodiments, the UE 502 sends a NAS message identifying a new updated capability ID. The MME/AMF 506 or a similar entity in the network may translate this new capability ID (e.g., the capability ID may have been stored as an index pointer for a corresponding UE 502 capabilities including one or more of AS, RF, and NAS capabilities in the network/cloud) to fetch a set of UE 502 capabilities and transmit them to the RAN 504. In some embodiments, the UE 502 sends a message including only those capabilities that have changed as a delta to its base capabilities corresponding to a capability ID. The UE 502 may send this either: in response to a capability enquiry message received from the RAN 504; or, in a NAS message to the network so that the network can update its capability context for the UE 502 and send the updated capabilities to the RAN 504.

In certain embodiments, a capability ID is a short form (e.g., version) of complete capabilities supported by the UE 502. The network may identify a complete set of capabilities of a UE 502 based on a signaled short form identity (e.g., capability ID). As may be appreciated, each capability ID represented by a number of bits (e.g., 32, 64, 128, etc.) may be expanded into a complete set of capabilities through a mapping (e.g., fixed hard coded mapping) between an ID and capabilities.

As described in FIG. 5, the RAN 504 queries the UE 502 radio capability without waiting for completion of an NAS update procedure (e.g., without waiting for an indication from a CN (e.g. the MME/AMF 506)).

Figure 6:
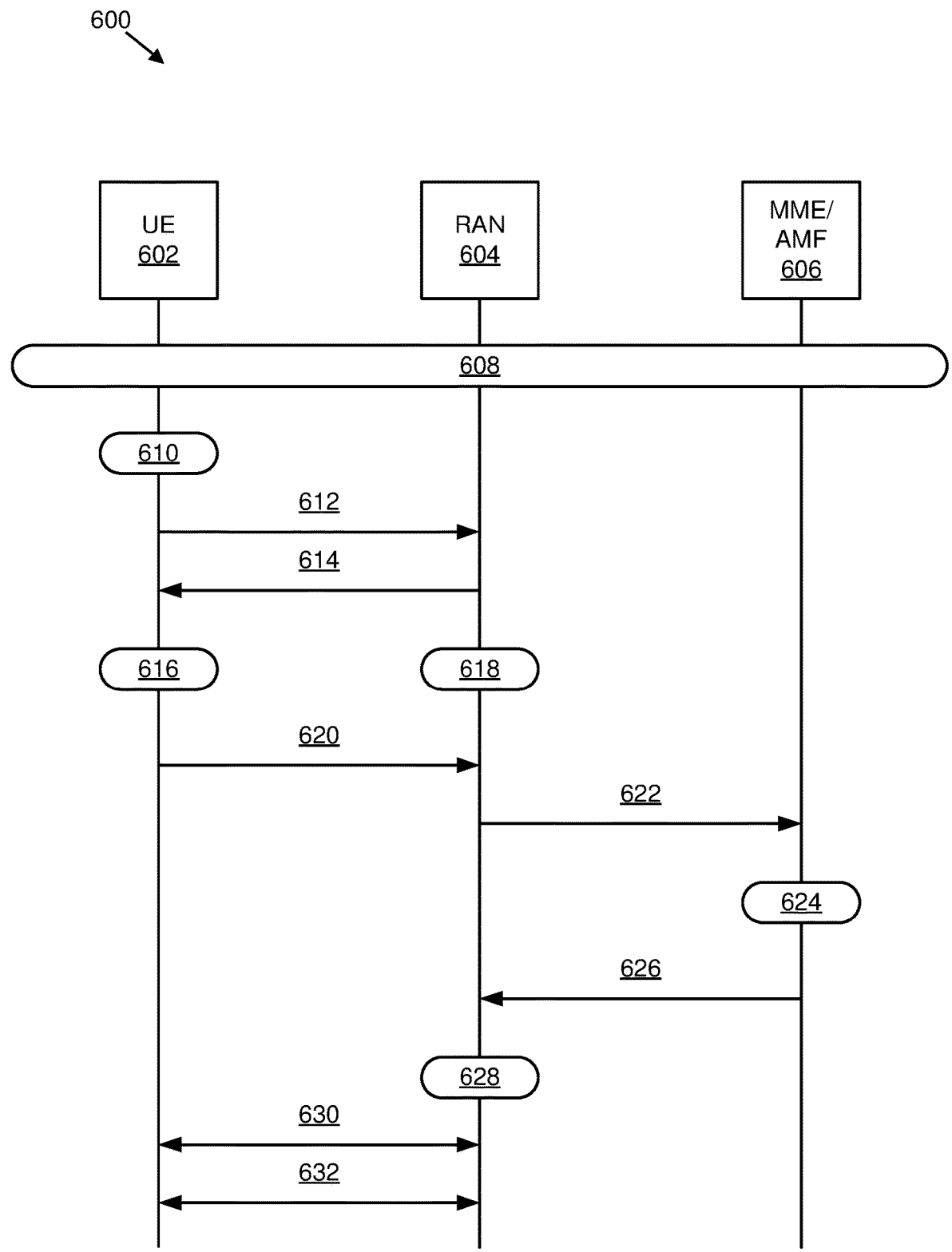
FIG. 6 is a schematic block diagram illustrating a further embodiment of communications for transmitting information indicating radio capability changes in an inactive state.

FIG. 6 is a schematic block diagram illustrating a further embodiment of communications 600 for transmitting information indicating radio capability changes in an inactive state. The communications 600 illustrated occur between a UE 602, a RAN (e.g., RAN node) 604, and an MME/AMF (e.g., MME and/or AMF) 606. As may be appreciated, any of the communications 600 described herein may include one or more messages.

In one embodiment, in communications 608 between the UE 602, the RAN 604, and the MIME/AMF 606, the UE 602 is registered in EPS or 5GS. The UE 602 is in an inactive state (e.g., "ECM-IDLE state with suspend indication" or "CM CONNECTED mode with RRC inactive indication").

In certain embodiments, the UE 602 changes 610 radio capabilities. Specifically, the NAS layer may change AS capabilities. In such embodiments, the UE NAS layer may know an RRC state (e.g., RRC connected state, RRC inactive state, RRC signaling connection is suspended). In some embodiments, if the RRC state is RRC inactive or the RRC signaling connection is suspended, and if the UE NAS layer is aware that the UE RRC layer supports a radio capability change during this state, the NAS layer generates and sends to the AS layer an NAS update message including an indication that a UE radio capability update is required. For example, in EPS, the NAS message is a TAU request message containing an indication for "UE Radio Capability Update." As another example, in 5GS the NAS RR message has a registration type set to mobility registration update indicating "UE Radio Capability Update."

In some embodiments, in a first communication 612 transmitted from the UE 602 to the RAN 604, the UE 602 sends a resume request message (e.g., RRCResumeRequest message) with a parameter indicating a change in radio capabilities. The parameter may not include actual change capabilities, but may include an indication that the UE 602 capabilities have changed compared with a previous RRC connection. In certain embodiments, the parameter may use a predefined LCID for the resume request message. In various embodiments, the resume request message may be an RRC message that is carried on an UL CCCH. In such embodiments, a LCID (e.g., a reserved LCID for UL) may be defined that identifies the CCCH and indicates to a network entity (e.g., eNB or gNB) that radio capability has changed. Table 1 shows some potential LCID values. It should be noted that 2 LCDs are used in Table 1 to indicate CCCH of different sizes (e.g., specific to NR).

In certain embodiments, the parameter that indicates a radio capability change may be a flag (e.g., one bit) in a MAC header. In such embodiments, the flag may be set to "1" to indicate that the radio capability has changed, and the flag may be set to "0" to indicate that the radio capability has not changed. In various embodiments, a reserved bit ("R") in a MAC subheader may be used as the flag. Tables 2 through 4 illustrate various embodiments of using the reserved bit shown as "R".

In various embodiments, a resume cause value may be used in an RRC resume request message to indicate to the RAN 604 a radio capability change. In such embodiments, the RRC resume request message contains a resume cause field that is used to provide the RAN 604 (e.g., a gNB in 5G NR system) with information about the reason why the UE 602 is trying to resume the connection.

In some embodiments, in a second communication 614 transmitted from the RAN 604 to the UE 602, the RAN 604 sends a resume message (e.g., RRC resume message) to the UE 602. The resume message includes an indication to suspend the DRBs (e.g., the DRBs are not yet to be activated—no UL/DL data is to be sent due to the ongoing radio capability change procedure). The resume message may be a RRCResume message with a parameter for suspending (or not activating) the DRBs. For example, the RAN 604 may acknowledge an RRCResumeRequest with an RRCResume without including any RadioBearerConfig parameters and/or measConfig (e.g., for measurement configuration). In certain embodiments, as a result of the UE 602 receiving the RRCResume message, only the secure RRC signaling connection (e.g., SRB1 and/or SRB2) may be activated. As may be appreciated, the secure signaling connection may be activated with the assumption that none of the changes of the UE 602 AS capability change affects the UE's 602 security capabilities (e.g., supported security algorithms, etc.).

In some embodiments, if the RAN 604 can't successfully fetch the UE 602 context (e.g., UE 602 context not found in an anchor RAN), the RAN 604 may send in the second communication 614 a setup message (e.g., RRCSetup message) to the UE 602 instead of the resume message.

In various embodiments, the RAN 604 may send in the second communication 614 a release message (e.g., RRCRelease message without suspendConfig) to the UE 602 instead of the resume message. In such embodiments, if the RRCRelease message without suspendConfig was received in response to the resume request message, upon indication from lower layers (e.g., AS layer) to the NAS layer that the RRC connection resume has failed and indication from the lower layers that the RRC connection is not suspended, the UE 602 may enter ECM/CM IDLE state (e.g., normal IDLE state without suspend indication) and may restart an ongoing NAS procedure. This may mean that the NAS layer reattempts sending the NAS message (e.g., NAS TAU/RR message) indicating "UE Radio Capability Update."

In various embodiments, in response to receiving the resume message with the indication to suspend the DRBs, the UE 602 suspends 616 all configured DRBs (e.g., no UL transmission) and the RAN 604 suspends 618 all configured DRBs (e.g., no DL transmission). In such embodiments, as a result the UE 602 doesn't consider the suspended DRBs for buffer status reporting and other L2 procedures. Therefore, only transmission of RRC signaling is possible (e.g., using SRB1 or SRB2 signaling radio bearers). In some embodiments, the resume message may include a new IE to convey the indication to suspend the DRBs. In certain embodiments, the resume message may use the MAC header (e.g., a one-bit flag) to convey the indication to suspend the DRBs. In some embodiments, the resume message may include a new LCID for DL-SCH to convey the indication to suspend the DRBs (e.g., LCID value 100001 identifying the SRB (e.g., DCCH) that is used to carry the resume message+indicating suspension of DRBs).

In certain embodiments, the UE 602 doesn't consider DRBs for UL transmission. In such embodiments, no new indication within the resume message is necessary. Accordingly, the UE 602 autonomously suspends the DRBs if receiving the resume message in response to having sent the resume request message with the indication that radio capabilities have changed.

In some embodiments, in a third communication 620 transmitted from the UE 602 to the RAN 604, the UE 602 sends a message (e.g., RRC message #5) to the RAN 604 carrying a NAS MM message. In such embodiments, the message may be a RRCResumeComplete message. The RRCResumeComplete message may include (or encapsulate) the NAS update message having an indication about the UE radio capability update (e.g., EPS TAU request message or 5GS registration request message having type mobility registration update indicating "UE Radio Capability Update").

As may be appreciated, in response to the second communication 614 including a setup message, the third communication 620 may include a setup complete message (e.g., RRCConnectionSetupComplete) that may include (or encapsulate) the NAS update message having an indication about the UE radio capability update (e.g., EPS TAU request message or 5GS registration request message having type mobility registration update indicating "UE Radio Capability Update").

In certain embodiments, in a fourth communication 622 transmitted from the RAN 604 to the MME/AMF 606, the RAN 604 sends the message (e.g., RRC message #5) carrying the NAS MM message to the MME/AMF 606.

At reception of the NAS message, the UE's 402 state in the MME/AMF 606 is CM connected. The MME/AMF 606 keeps 624 the UE 602 in ECM/CM connected state. The MME/AMF 606 deletes the stored UE 602 radio capabilities and initiates a procedure to inform the RAN 604 about the UE 602 radio capability change.

In various embodiments, in a fifth communication 626 transmitted from the MME/AMF 606 to the RAN 604, the MME/AMF 606 initiates signaling to inform the RAN 604 about the changed UE 602 radio capabilities.

At reception of the signaling, the RAN 604 deletes 628 the stored UE 602 radio capabilities.

In some embodiments, in a sixth communication 630 transmitted between the UE 602 and the RAN 604, the RAN 604 uses an existing RRC signaling connection to perform inquiry of the new UE 602 radio capabilities. For example, the UE 602 radio capability inquiry may be performed over the an SRB (e.g., SRB1 or SRB2) via RRC procedures. For example, the RAN 604 sends a UE 602 capability enquiry to the UE 602 and the UE 602 sends a UE 602 capability response including available radio capabilities. The RAN 604 stores the available radio capabilities in the UE 602 context. In certain embodiments, upon release of the signaling connection (e.g., upon transition to NAS/RRC IDLE state), the RAN 604 sends the UE 602 radio capabilities along with other RAN-specific information for storage in the CN serving node (e.g. the MME/AMF 606).

In certain embodiments, in a seventh communication 632 transmitted between the UE 602 and the RAN 604, the RAN 604 may perform a RRC connection reconfiguration procedure to configure (or reconfigure) the UE 602 radio resources and to enable and/or activate corresponding DRBs that already have a context in the UE's 602 AS context, and the RAN 604 UE 602 context from the time at which the RRC connection was suspended or the RRC connection was released with an RRC inactive indication.

In various embodiments, the UE 602 sends a NAS message identifying a new updated capability ID. The MME/AMF 606 or a similar entity in the network may translate this new capability ID (e.g., the capability ID may have been stored as an index pointer for a corresponding UE 602 capabilities including one or more of AS, RF, and NAS capabilities in the network/cloud) to fetch a set of UE 602 capabilities and transmit them to the RAN 604. In some embodiments, the UE 602 sends a message including only those capabilities that have changed as a delta to its base capabilities corresponding to a capability ID. The UE 602 may send this either: in response to a capability enquiry message received from the RAN 604; or, in a NAS message to the network so that the network can update its capability context for the UE 602 and send the updated capabilities to the RAN 604.

In certain embodiments, a capability ID is a short form (e.g., version) of complete capabilities supported by the UE 602. The network may identify a complete set of capabilities of a UE 602 based on a signaled short form identity (e.g., capability ID). As may be appreciated, each capability ID represented by a number of bits (e.g., 32, 64, 128, etc.) may be expanded into a complete set of capabilities through a mapping (e.g., fixed hard coded mapping) between an ID and capabilities.

Figure 7:
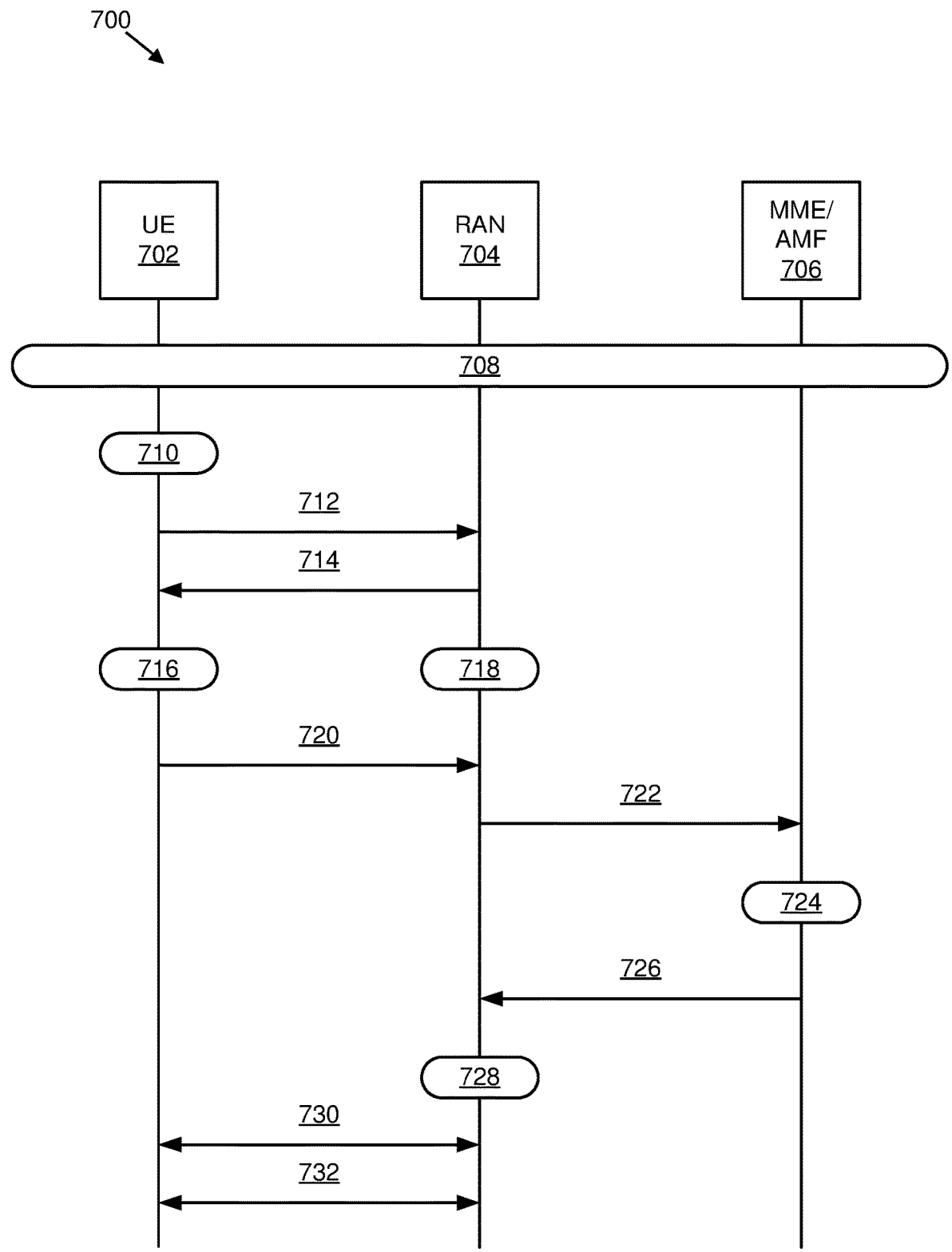
FIG. 7 is a schematic block diagram illustrating one embodiment of communications for transmitting information indicating radio capability changes in an idle state.

FIG. 7 is a schematic block diagram illustrating one embodiment of communications 700 for transmitting information indicating radio capability changes in an idle state. The communications 700 illustrated occur between a UE 702, a RAN (e.g., RAN node) 704, and an MME/AMF (e.g., MME and/or AMF) 706. As may be appreciated, any of the communications 700 described herein may include one or more messages.

In one embodiment, in communications 708 between the UE 702, the RAN 704, and the MME/AMF 706, the UE 702 is registered in EPS or 5GS. The UE 702 is in an inactive state (e.g., "ECM-IDLE state with suspend indication" or "CM CONNECTED mode with RRC inactive indication").

In certain embodiments, the UE 702 changes 710 radio capabilities. Specifically, the NAS layer may change AS capabilities. In such embodiments, the UE NAS layer may know an RRC state (e.g., RRC connected state, RRC inactive state, RRC signaling connection is suspended). In some embodiments, if the RRC state is RRC inactive or the RRC signaling connection is suspended, and if the UE NAS layer is aware that the UE RRC layer supports a radio capability change during this state, the NAS layer generates and sends to the AS layer an NAS update message including an indication that a UE radio capability update is required. For example, in EPS, the NAS message is a TAU request message containing an indication for "UE Radio Capability Update." As another example, in 5GS the NAS RR message has a registration type set to mobility registration update indicating "UE Radio Capability Update."

In certain embodiments, the UE 702 in the inactive state initiates transition to an idle state (e.g., RRC idle) on its own upon noticing a trigger to change UE 702 capabilities from an upper layer that would render some part of the stored UE 702 AS context useless or not valid (e.g., the stored DRB configuration can't be supported with the new updated capability anymore).

In some embodiments, in a first communication 712 transmitted from the UE 702 to the RAN 704, the UE 702 sends a resume request message (e.g., RRCResumeRequest message) with a parameter indicating a change in radio capabilities. The parameter may not include actual change capabilities, but may include an indication that the UE 702 capabilities have changed compared with a previous RRC connection. In certain embodiments, the parameter may use a predefined LCD for the resume request message. In various embodiments, the resume request message may be an RRC message that is carried on an UL CCCH. In such embodiments, a LCID (e.g., a reserved LCID for UL) may be defined that identifies the CCCH and indicates to a network entity (e.g., eNB or gNB) that radio capability has changed. Table 1 shows some potential LCID values. It should be noted that 2 LCDs are used in Table 1 to indicate CCCH of different sizes (e.g., specific to NR).

In some embodiments, the UE 702 upon noticing a trigger to change UE 702 capabilities from an upper layer that would render some part of the stored UE 702 AS context useless or not valid (e.g., the stored DRB configuration can't be supported with the new updated capability anymore), sends the resume request message to the network and indicates that the UE 702 needs to transition to an idle state (e.g., RRC idle) for the purpose of updating its capabilities.

In certain embodiments, the parameter that indicates a radio capability change may be a flag (e.g., one bit) in a MAC header. In such embodiments, the flag may be set to "1" to indicate that the radio capability has changed, and the flag may be set to "0" to indicate that the radio capability has not changed. In various embodiments, a reserved bit ("R") in a MAC subheader may be used as the flag. Tables 2 through 4 illustrate various embodiments of using the reserved bit shown as "R".

In various embodiments, a resume cause value may be used in an RRC resume request message to indicate to the RAN 704 a radio capability change. In such embodiments, the RRC resume request message contains a resume cause field that is used to provide the RAN 704 (e.g., a gNB in 5G NR system) with information about the reason why the UE 702 is trying to resume the connection.

In some embodiments, in a second communication 714 transmitted from the RAN 704 to the UE 702, the RAN 704 sends a release message (e.g., RRC release message) to the UE 702. The resume message may be a RRCRelease message.

In various embodiments, in response to receiving the release message, the UE 702 suspends 716 all configured DRBs (e.g., no UL transmission) and the RAN 704 suspends 718 all configured DRBs (e.g., no DL transmission).

In some embodiments, in a third communication 720 transmitted from the UE 702 to the RAN 704, the UE 702 sends a message (e.g., RRC message #5) to the RAN 704 carrying a NAS MM message. In such embodiments, the message may be a RRCResumeComplete message. The RRCResumeComplete message may include (or encapsulate) the NAS update message having an indication about the UE radio capability update (e.g., EPS TAU request message or 5GS registration request message having type mobility registration update indicating "UE Radio Capability Update").

In certain embodiments, in a fourth communication 722 transmitted from the RAN 704 to the MME/AMF 706, the RAN 704 sends the message (e.g., RRC message #5) carrying the NAS MM message to the MME/AMF 706.

At reception of the NAS message, the UE's 402 state in the MME/AMF 706 is CM connected. The MME/AMF 706 keeps 724 the UE 702 in ECM/CM connected state. The MME/AMF 706 deletes the stored UE 702 radio capabilities and initiates a procedure to inform the RAN 704 about the UE 702 radio capability change.

In various embodiments, in a fifth communication 726 transmitted from the MME/AMF 706 to the RAN 704, the MME/AMF 706 initiates signaling to inform the RAN 704 about the changed UE 702 radio capabilities.

At reception of the signaling, the RAN 704 deletes 728 the stored UE 702 radio capabilities.

In some embodiments, in a sixth communication 730 transmitted between the UE 702 and the RAN 704, the RAN 704 uses an existing RRC signaling connection to perform inquiry of the new UE 702 radio capabilities. For example, the UE 702 radio capability inquiry may be performed over the an SRB (e.g., SRB1 or SRB2) via RRC procedures. For example, the RAN 704 sends a UE 702 capability enquiry to the UE 702 and the UE 702 sends a UE 702 capability response including available radio capabilities. The RAN 704 stores the available radio capabilities in the UE 702 context. In certain embodiments, upon release of the signaling connection (e.g., upon transition to NAS/RRC IDLE state), the RAN 704 sends the UE 702 radio capabilities along with other RAN-specific information for storage in the CN serving node (e.g. the MME/AMF 706).

In certain embodiments, in a seventh communication 732 transmitted between the UE 702 and the RAN 704, the RAN 704 may perform a RRC connection reconfiguration procedure to configure (or reconfigure) the UE 702 radio resources and to enable and/or activate corresponding DRBs that already have a context in the UE's 702 AS context, and the RAN 704 UE 702 context from the time at which the RRC connection was suspended or the RRC connection was released with an RRC inactive indication.

In various embodiments, the UE 702 sends a NAS message identifying a new updated capability ID. The MME/AMF 706 or a similar entity in the network may translate this new capability ID (e.g., the capability ID may have been stored as an index pointer for a corresponding UE 702 capabilities including one or more of AS, RF, and NAS capabilities in the network/cloud) to fetch a set of UE 702 capabilities and transmit them to the RAN 704. In some embodiments, the UE 702 sends a message including only those capabilities that have changed as a delta to its base capabilities corresponding to a capability ID. The UE 702 may send this either: in response to a capability enquiry message received from the RAN 704; or, in a NAS message to the network so that the network can update its capability context for the UE 702 and send the updated capabilities to the RAN 704.

In certain embodiments, a capability ID is a short form (e.g., version) of complete capabilities supported by the UE 702. The network may identify a complete set of capabilities of a UE 702 based on a signaled short form identity (e.g., capability ID). As may be appreciated, each capability ID represented by a number of bits (e.g., 32, 64, 128, etc.) may be expanded into a complete set of capabilities through a mapping (e.g., fixed hard coded mapping) between an ID and capabilities.

As may be appreciated, during a UE capability inquiry procedure described herein, a UE may send (instead of a full radio capability) one or more UE radio capability IDs. Accordingly, the UE transmits the radio capability IDs included in an NAS message transmitted to the MME/AMF. The MME/AMF in turn translates them into full radio capabilities and sends them to a RAN.

Figure 8:
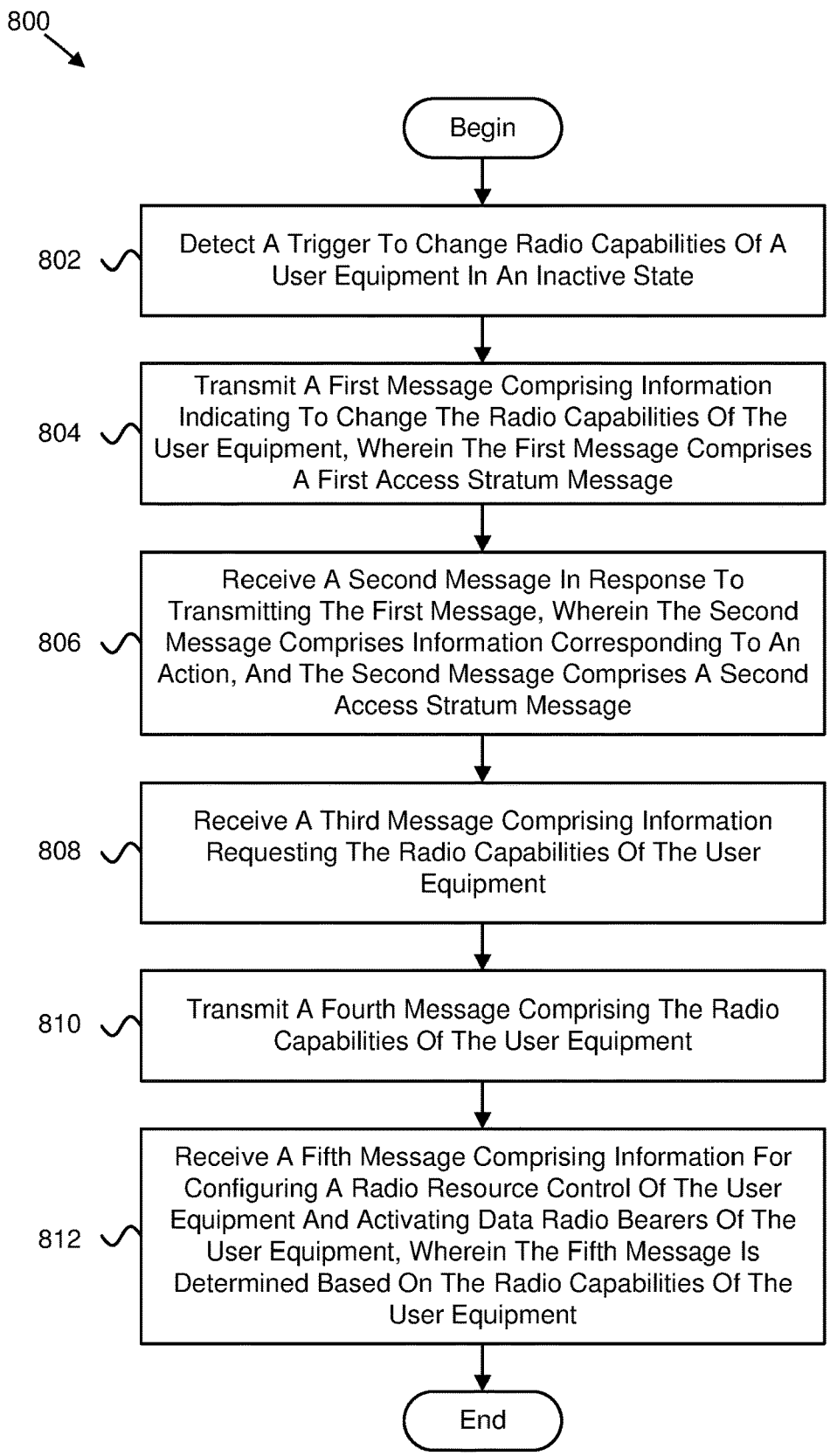
FIG. 8 is a flow chart diagram illustrating one embodiment of a method for transmitting information indicating radio capability changes in an inactive state.

FIG. 8 is a flow chart diagram illustrating one embodiment of a method 800 for transmitting information indicating radio capability changes in an inactive state. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include detecting 802 a trigger to change radio capabilities of a user equipment in an inactive state. In certain embodiments, the method 800 includes transmitting 804 a first message comprising information indicating to change the radio capabilities of the user equipment, wherein the first message comprises a first access stratum message. In various embodiments, the method 800 includes receiving 806 a second message in response to transmitting the first message, wherein the second message comprises information corresponding to an action, and the second message comprises a second access stratum message. In some embodiments, the method 800 includes receiving 808 a third message comprising information requesting the radio capabilities of the user equipment. In certain embodiments, the method 800 includes transmitting 810 a fourth message comprising the radio capabilities of the user equipment. In various embodiments, the method 800 includes receiving 812 a fifth message comprising information for configuring a radio resource control of the user equipment and activating data radio bearers of the user equipment, wherein the fifth message is determined based on the radio capabilities of the user equipment.

In certain embodiments, the first message comprises a radio resource control resume request message. In some embodiments, the first message comprises information indicating a transition of the user equipment to an idle state. In various embodiments, a radio access network determines a type of the second message and the information included in the second message.

In one embodiment, the second message comprises a radio resource control resume message. In certain embodiments, the second message comprises information indicating to suspend the data radio bearers of the user equipment. In some embodiments, the method 800 further comprises suspending the data radio bearers of the user equipment in response to receiving the second message.

In various embodiments, the second message comprises a radio resource control setup message. In one embodiment, the second message comprises a radio resource control release message. In certain embodiments, the method 800 further comprises, prior to receiving the third message, transmitting a non-access stratum message indicating the change to the radio capabilities of the user equipment. In some embodiments, the non-access stratum message is transmitted to a radio access network, a mobility management entity, or an access and mobility management function.

Figure 9:
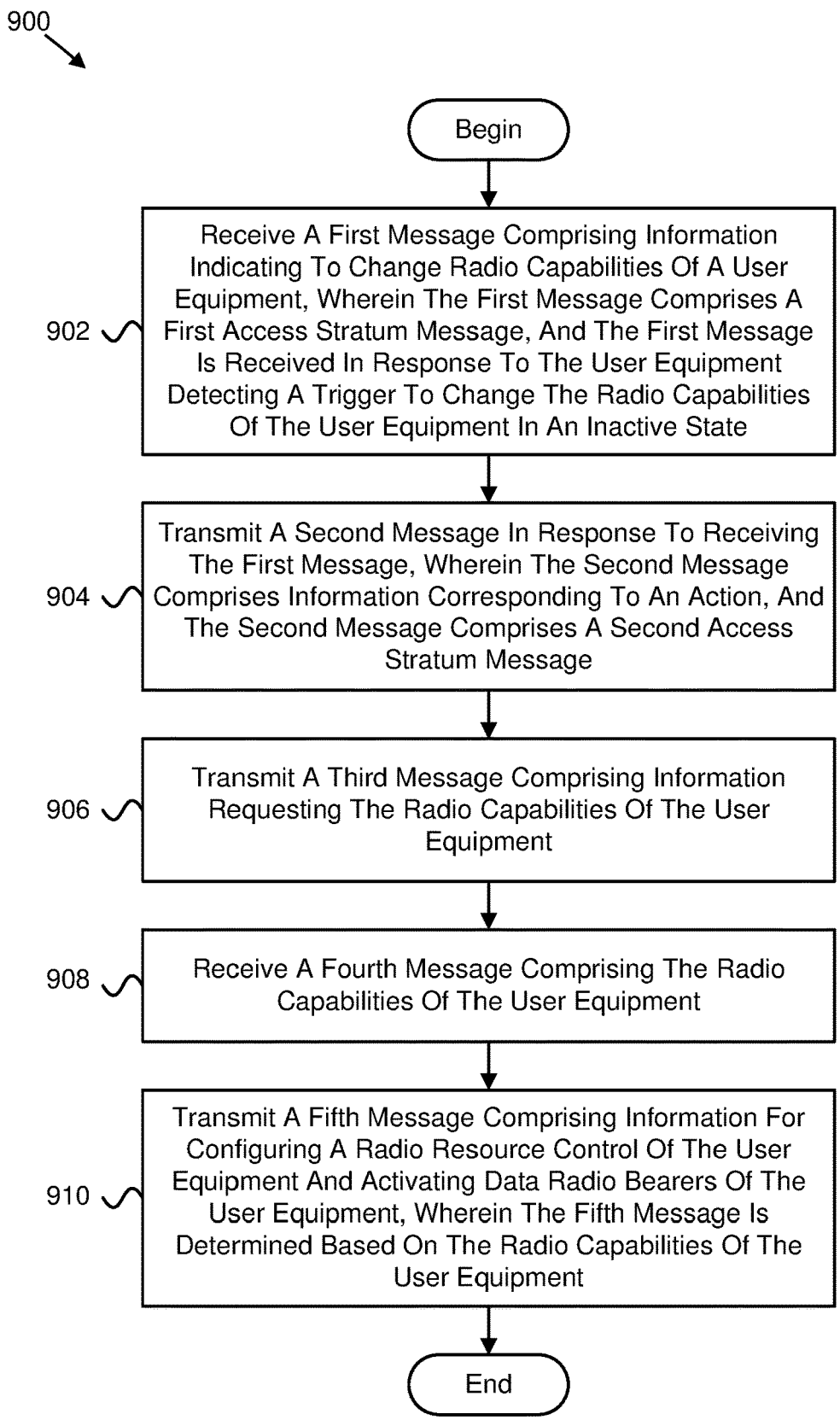
FIG. 9 is a flow chart diagram illustrating one embodiment of a method for receiving information indicating radio capability changes in an inactive state.

FIG. 9 is a flow chart diagram illustrating one embodiment of a method 900 for receiving information indicating radio capability changes in an inactive state. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a first message comprising information indicating to change radio capabilities of a user equipment, wherein the first message comprises a first access stratum message, and the first message is received in response to the user equipment detecting a trigger to change the radio capabilities of the user equipment in an inactive state. In various embodiments, the method 900 includes transmitting 904 a second message in response to receiving the first message, wherein the second message comprises information corresponding to an action, and the second message comprises a second access stratum message. In certain embodiments, the method 900 includes transmitting 906 a third message comprising information requesting the radio capabilities of the user equipment. In some embodiments, the method 900 includes receiving 908 a fourth message comprising the radio capabilities of the user equipment. In various embodiments, the method 900 includes transmitting 910 a fifth message comprising information for configuring a radio resource control of the user equipment and activating data radio bearers of the user equipment, wherein the fifth message is determined based on the radio capabilities of the user equipment.

In certain embodiments, the first message comprises a radio resource control resume request message. In some embodiments, the first message comprises information indicating a transition of the user equipment to an idle state. In various embodiments, a radio access network determines a type of the second message and the information included in the second message.

In one embodiment, the second message comprises a radio resource control resume message. In certain embodiments, the second message comprises information indicating to suspend the data radio bearers of the user equipment. In some embodiments, the second message comprises a radio resource control setup message.

In various embodiments, the second message comprises a radio resource control release message. In one embodiment, the method 900 further comprises, prior to transmitting the third message, receiving a non-access stratum message indicating the change to the radio capabilities of the user equipment. In certain embodiments, the non-access stratum message is received at a radio access network, a mobility management entity, or an access and mobility management function.

In one embodiment, a method comprises: detecting a trigger to change radio capabilities of a user equipment in an inactive state; transmitting a first message comprising information indicating to change the radio capabilities of the user equipment, wherein the first message comprises a first access stratum message; receiving a second message in response to transmitting the first message, wherein the second message comprises information corresponding to an action, and the second message comprises a second access stratum message; receiving a third message comprising information requesting the radio capabilities of the user equipment; transmitting a fourth message comprising the radio capabilities of the user equipment; and receiving a fifth message comprising information for configuring a radio resource control of the user equipment and activating data radio bearers of the user equipment, wherein the fifth message is determined based on the radio capabilities of the user equipment.

In certain embodiments, the first message comprises a radio resource control resume request message.

In some embodiments, the first message comprises information indicating a transition of the user equipment to an idle state.

In various embodiments, a radio access network determines a type of the second message and the information included in the second message.

In one embodiment, the second message comprises a radio resource control resume message.

In certain embodiments, the second message comprises information indicating to suspend the data radio bearers of the user equipment.

In some embodiments, the method further comprises suspending the data radio bearers of the user equipment in response to receiving the second message.

In various embodiments, the second message comprises a radio resource control setup message.

In one embodiment, the second message comprises a radio resource control release message.

In certain embodiments, the method further comprises, prior to receiving the third message, transmitting a non-access stratum message indicating the change to the radio capabilities of the user equipment.

In some embodiments, the non-access stratum message is transmitted to a radio access network, a mobility management entity, or an access and mobility management function.

In one embodiment, an apparatus comprises: a processor that detects a trigger to change radio capabilities of a user equipment in an inactive state; a transmitter that transmits a first message comprising information indicating to change the radio capabilities of the user equipment, wherein the first message comprises a first access stratum message; and a receiver that: receives a second message in response to transmitting the first message, wherein the second message comprises information corresponding to an action, and the second message comprises a second access stratum message; and receives a third message comprising information requesting the radio capabilities of the user equipment; wherein: the transmitter transmits a fourth message comprising the radio capabilities of the user equipment; and the receiver receives a fifth message comprising information for configuring a radio resource control of the user equipment and activating data radio bearers of the user equipment, wherein the fifth message is determined based on the radio capabilities of the user equipment.

In certain embodiments, the first message comprises a radio resource control resume request message.

In some embodiments, the first message comprises information indicating a transition of the user equipment to an idle state.

In various embodiments, a radio access network determines a type of the second message and the information included in the second message.

In one embodiment, the second message comprises a radio resource control resume message.

In certain embodiments, the second message comprises information indicating to suspend the data radio bearers of the user equipment.

In some embodiments, the processor suspends the data radio bearers of the user equipment in response to receiving the second message.

In various embodiments, the second message comprises a radio resource control setup message.

In one embodiment, the second message comprises a radio resource control release message.

In certain embodiments, prior to receiving the third message, the transmitter transmits a non-access stratum message indicating the change to the radio capabilities of the user equipment.

In some embodiments, the non-access stratum message is transmitted to a radio access network, a mobility management entity, or an access and mobility management function.

In one embodiment, a method comprises: receiving a first message comprising information indicating to change radio capabilities of a user equipment, wherein the first message comprises a first access stratum message, and the first message is received in response to the user equipment detecting a trigger to change the radio capabilities of the user equipment in an inactive state; transmitting a second message in response to receiving the first message, wherein the second message comprises information corresponding to an action, and the second message comprises a second access stratum message; transmitting a third message comprising information requesting the radio capabilities of the user equipment; receiving a fourth message comprising the radio capabilities of the user equipment; and transmitting a fifth message comprising information for configuring a radio resource control of the user equipment and activating data radio bearers of the user equipment, wherein the fifth message is determined based on the radio capabilities of the user equipment.

In certain embodiments, the first message comprises a radio resource control resume request message.

In some embodiments, the first message comprises information indicating a transition of the user equipment to an idle state.

In various embodiments, a radio access network determines a type of the second message and the information included in the second message.

In one embodiment, the second message comprises a radio resource control resume message.

In certain embodiments, the second message comprises information indicating to suspend the data radio bearers of the user equipment.

In some embodiments, the second message comprises a radio resource control setup message.

In various embodiments, the second message comprises a radio resource control release message.

In one embodiment, the method further comprises, prior to transmitting the third message, receiving a non-access stratum message indicating the change to the radio capabilities of the user equipment.

In certain embodiments, the non-access stratum message is received at a radio access network, a mobility management entity, or an access and mobility management function.

In one embodiment, an apparatus comprises: a receiver that receives a first message comprising information indicating to change radio capabilities of a user equipment, wherein the first message comprises a first access stratum message, and the first message is received in response to the user equipment detecting a trigger to change the radio capabilities of the user equipment in an inactive state; and a transmitter that: transmits a second message in response to receiving the first message, wherein the second message comprises information corresponding to an action, and the second message comprises a second access stratum message; and transmits a third message comprising information requesting the radio capabilities of the user equipment; wherein: the receiver receives a fourth message comprising the radio capabilities of the user equipment; and the transmitter transmits a fifth message comprising information for configuring a radio resource control of the user equipment and activating data radio bearers of the user equipment, wherein the fifth message is determined based on the radio capabilities of the user equipment.

In certain embodiments, the first message comprises a radio resource control resume request message.

In some embodiments, the first message comprises information indicating a transition of the user equipment to an idle state.

In various embodiments, a radio access network determines a type of the second message and the information included in the second message.

In one embodiment, the second message comprises a radio resource control resume message.

In certain embodiments, the second message comprises information indicating to suspend the data radio bearers of the user equipment.

In some embodiments, the second message comprises a radio resource control setup message.

In various embodiments, the second message comprises a radio resource control release message.

In one embodiment, prior to transmitting the third message, the receiver receives a non-access stratum message indicating the change to the radio capabilities of the user equipment.

In certain embodiments, the non-access stratum message is received at a radio access network, a mobility management entity, or an access and mobility management function.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   detecting a trigger to change radio capabilities of a user equipment in an inactive state;
   transmitting a first message comprising information indicating to change the radio capabilities of the user equipment, wherein the first message comprises a first access stratum message;
   receiving a second message in response to transmitting the first message, wherein the second message comprises information corresponding to an action, and the second message comprises a second access stratum message;
   receiving a third message after receiving the second message, wherein the third message comprises information requesting the radio capabilities of the user equipment;
   in response to receiving the third message, transmitting a fourth message comprising the radio capabilities of the user equipment; and
   receiving a fifth message after transmitting the fourth message, wherein the fifth message comprises information for configuring a radio resource control of the user equipment and activating data radio bearers of the user equipment, wherein the fifth message is determined based on the radio capabilities of the user equipment.

2. The method of claim 1, wherein the first message comprises a radio resource control resume request message.

3. The method of claim 1, wherein the first message comprises information indicating a transition of the user equipment to an idle state.

4. The method of claim 1, wherein a radio access network determines a type of the second message and the information included in the second message.

5. The method of claim 1, wherein the second message comprises a radio resource control resume message.

6. The method of claim 5, wherein the second message comprises information indicating to suspend the data radio bearers of the user equipment.

7. The method of claim 6, further comprising suspending the data radio bearers of the user equipment in response to receiving the second message.

8. The method of claim 1, wherein the second message comprises a radio resource control setup message.

9. The method of claim 1, wherein the second message comprises a radio resource control release message.

10. The method of claim 1, further comprising, prior to receiving the third message, transmitting a non-access stratum message indicating the change to the radio capabilities of the user equipment.

11. The method of claim 10, wherein the non-access stratum message is transmitted to a radio access network, a mobility management entity, or an access and mobility management function.

12. An apparatus comprising:
   a processor that detects a trigger to change radio capabilities of a user equipment in an inactive state;
   a transmitter that transmits a first message comprising information indicating to change the radio capabilities of the user equipment, wherein the first message comprises a first access stratum message; and
   a receiver that:
      receives a second message in response to transmitting the first message, wherein the second message comprises information corresponding to an action, and the second message comprises a second access stratum message; and receives a third message after receiving the second message, wherein the third message comprises information requesting the radio capabilities of the user equipment;

wherein:
the transmitter, in response to receiving the third message, transmits a fourth message comprising the radio capabilities of the user equipment; and
the receiver receives a fifth message after transmitting the fourth message, wherein the fifth message comprises information for configuring a radio resource control of the user equipment and activating data radio bearers of the user equipment, wherein the fifth message is determined based on the radio capabilities of the user equipment.

13. A method comprising:
receiving a first message comprising information indicating to change radio capabilities of a user equipment, wherein the first message comprises a first access stratum message, and the first message is received in response to the user equipment detecting a trigger to change the radio capabilities of the user equipment in an inactive state;
transmitting a second message in response to receiving the first message, wherein the second message comprises information corresponding to an action, and the second message comprises a second access stratum message;
transmitting a third message after transmitting the second message, wherein the third message comprises information requesting the radio capabilities of the user equipment;
receiving a fourth message after transmitting the third message, wherein the third message comprises the radio capabilities of the user equipment; and
transmitting a fifth message after receiving the fourth message, wherein the fifth message comprises information for configuring a radio resource control of the user equipment and activating data radio bearers of the user equipment, wherein the fifth message is determined based on the radio capabilities of the user equipment.

14. The method of claim 13, wherein the first message comprises a radio resource control resume request message.

15. The method of claim 13, wherein the first message comprises information indicating a transition of the user equipment to an idle state.

16. The method of claim 13, wherein a radio access network determines a type of the second message and the information included in the second message.

17. The method of claim 13, wherein the second message comprises a radio resource control resume message.

18. The method of claim 17, wherein the second message comprises information indicating to suspend the data radio bearers of the user equipment.

19. The method of claim 13, wherein the second message comprises a radio resource control setup message.

20. The method of claim 13, wherein the second message comprises a radio resource control release message.

21. The method of claim 13, further comprising, prior to transmitting the third message, receiving a non-access stratum message indicating the change to the radio capabilities of the user equipment.

22. The method of claim 21, wherein the non-access stratum message is received at a radio access network, a mobility management entity, or an access and mobility management function.

23. An apparatus comprising:
a receiver that receives a first message comprising information indicating to change radio capabilities of a user equipment, wherein the first message comprises a first access stratum message, and the first message is received in response to the user equipment detecting a trigger to change the radio capabilities of the user equipment in an inactive state; and
a transmitter that:
transmits a second message in response to receiving the first message, wherein the second message comprises information corresponding to an action, and the second message comprises a second access stratum message; and
transmits a third message after transmitting the second message, wherein the third message comprises information requesting the radio capabilities of the user equipment;

wherein:
the receiver receives a fourth message after transmitting the third message, wherein the third message comprises the radio capabilities of the user equipment; and
the transmitter transmits a fifth message after receiving the fourth message, wherein the fifth message comprises information for configuring a radio resource control of the user equipment and activating data radio bearers of the user equipment, wherein the fifth message is determined based on the radio capabilities of the user equipment.

* * * * *